United States Patent
Sano (10) Patent No.: US 8,799,091 B2
(45) Date of Patent: Aug. 5, 2014

(54) POS TERMINAL AND CONTROL METHOD

(75) Inventor: Takeshi Sano, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/166,870

(22) Filed: Jun. 23, 2011

(65) Prior Publication Data

US 2011/0320298 A1    Dec. 29, 2011

(30) Foreign Application Priority Data

Jun. 25, 2010   (JP) ................. 2010-144765

(51) Int. Cl.
*G07G 1/12*     (2006.01)
*G07G 5/00*     (2006.01)

(52) U.S. Cl.
USPC .............. 705/24; 705/16; 705/33; 705/62; 235/379

(58) Field of Classification Search
None
See application file for complete search history.

(56) References Cited

U.S. PATENT DOCUMENTS

| 6,105,867 | A | * | 8/2000 | Shimizu et al. | 235/383 |
| RE41,717 | E | * | 9/2010 | Dejaeger | 235/383 |
| 2011/0015986 | A1 | * | 1/2011 | Takagi | 705/14.38 |

FOREIGN PATENT DOCUMENTS

| JP | 2000-137754 | 5/2000 |
| JP | 2005-056143 | 3/2005 |
| JP | 2006-343940 | 12/2006 |
| JP | 2009-239465 | 10/2009 |

OTHER PUBLICATIONS

Japanese Office Action for Japanese Application No. 2010-144765 mailed on Apr. 17, 2012.

* cited by examiner

*Primary Examiner* — Fateh Obaid
(74) *Attorney, Agent, or Firm* — Amin, Turocy & Watson, LLP (57) ABSTRACT

According to one embodiment, a POS terminal includes a printer, a display, a screen display section, a selection operation input section, and an issue section. The printer prints and issues a receipt related to a commodity transaction. The display displays information. The screen display section displays, on the display, a selection screen for selecting an information item to be printed on the receipt. The selection-operation input section selects, according to selection operation in the selection screen displayed by the screen display section, the information item to be printed on the receipt. The issue section issues a receipt on which the information item selected by the selection-operation input section is printed and an information item not selected by the selection-operation input section is not printed.

16 Claims, 8 Drawing Sheets

```
┌─────────────────────────────┐ ⎡R1
│     ┌───────────┐           │
│     │  ○○STORE  │           │
│     └───────────┘           │
│  JUNE 23 (WED), 2010 12:00 NO:0001 │
│                             │
│  ELECTRONIC MONEY    US$ 30 │
│  PAYMENT                    │
│  ELECTRONIC MONEY    US$ 170│
│  BALANCE                    │
│  ─────────────────────────  │
│                             │
│  TRANSACTION NO 1234        │
│  TWO ITEMS PURCHASED        │
│  9901: PERSON IN CHARGE 1   │
└─────────────────────────────┘
```

FIG.8B

```
┌─────────────────────────────┐ ⎡R2
│     ┌───────────┐           │
│     │  ○○STORE  │           │
│     └───────────┘           │
│  JUNE 23 (WED), 2010 12:00 NO:0001 │
│                             │
│  COMMODITY ABC       US$ 10 │
│  COMMODITY XYZ       US$ 20 │
│                             │
│  TOTAL               US$ 30 │
│  ELECTRONIC MONEY    US$ 30 │
│  ─────────────────────────  │
│  ELECTRONIC MONEY    US$ 30 │
│  PAYMENT                    │
│  ELECTRONIC MONEY    US$ 170│
│  BALANCE                    │
│  ─────────────────────────  │
│  PRESENT POINT          30P │
│  CUMULATIVE POINT    1,234P │
│  ─────────────────────────  │
│                             │
│  TRANSACTION NO 1234        │
│  TWO ITEMS PURCHASED        │
│  9901: PERSON IN CHARGE 1   │
└─────────────────────────────┘
```

POS TERMINAL AND CONTROL METHOD

CROSS-REFERENCE TO RELATED APPLICATION

This application is based upon and claims the benefit of priority from the prior Japanese Patent Application No. 2010-144765, filed on Jun. 25, 2010; the entire contents of which are incorporated herein by reference.

FIELD

Embodiments described herein relate generally to a POS terminal and a control method.

BACKGROUND

In the past, a POS (Point Of Sales System) terminal that prints and issues a receipt is generally well known.

DETAILED DESCRIPTION

In a POS terminal in the past, a receipt on which printing of information items unnecessary for a customer is omitted cannot be issued.

In general, according to one embodiment, a POS terminal includes a printer, a display, a screen display section, a selection-operation input section, and an issue section. The printer prints and issues a receipt related to a commodity transaction. The display displays information. The screen display section displays, on the display, a selection screen for selecting information items to be printed on the receipt. The selection-operation input section selects, according to selection operation in the selection screen displayed by the screen display section, information items to be printed on the receipt. The issue section issues, with the printer, a receipt on which the information items selected by the selection-operation input section are printed and information items not selected by the selection-operation input section are not printed.

Embodiments are explained below with reference to the accompanying drawings.

In the following explanation, a self-type settlement apparatus with which a customer himself or herself performs commodity registration operation and settlement operation and can make a cash payment or a payment using various cards such as an electronic card, a credit card, and a debit card is explained as a settlement apparatus according to an embodiment.

Figure 1:
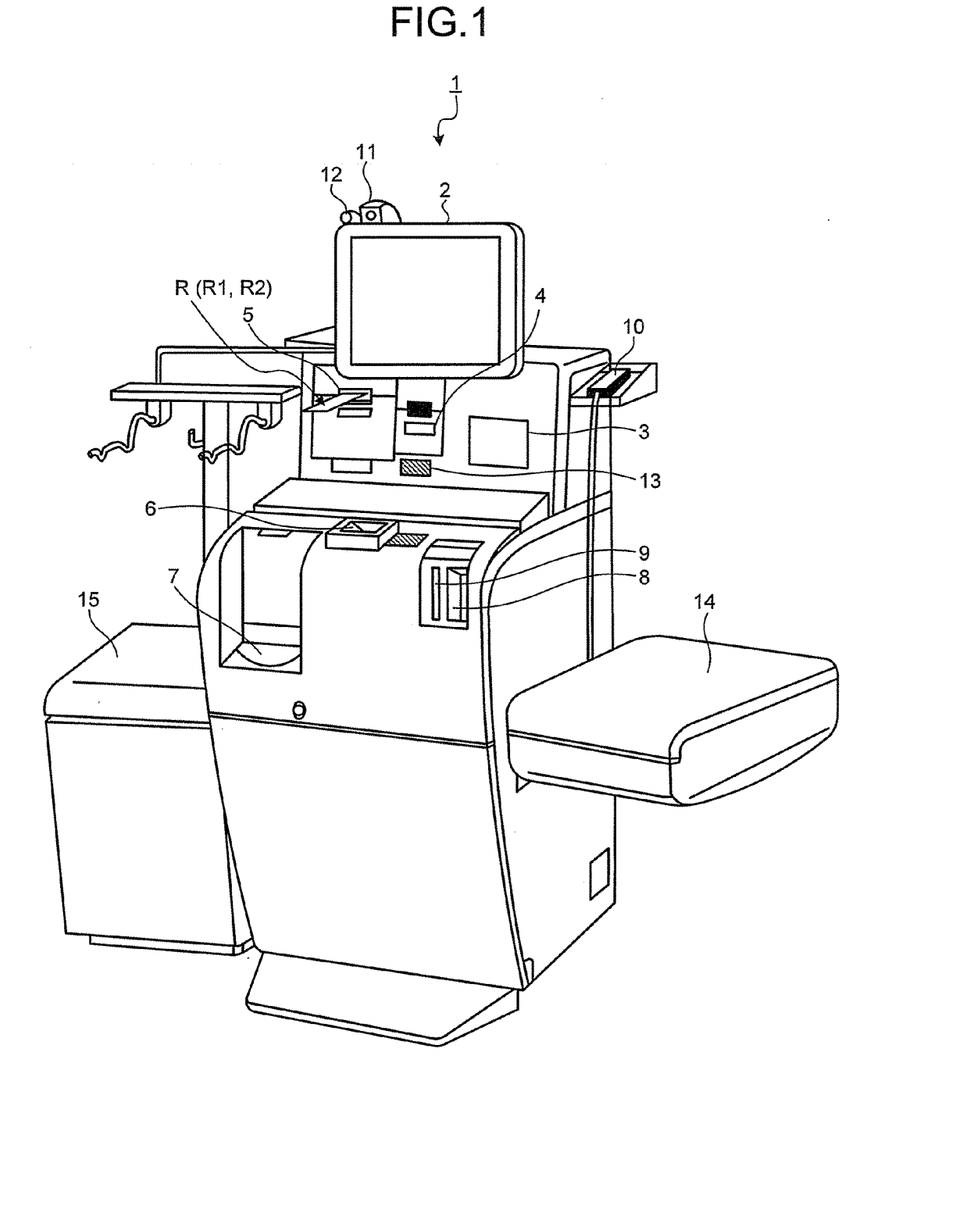
FIG. 1 is a perspective view of an external configuration of a POS terminal according to an embodiment.

FIG. 1 is a perspective view for explaining an external configuration of a settlement apparatus 1 according to this embodiment.

The settlement apparatus 1 includes a touch panel-type liquid crystal display 2, a scanner 3, a card insertion port 4, a receipt issue port 5, a coin input port 6, a coin discharge port 7, a bill input port 8, a bill discharge port 9, a hand-held scanner 10, a camera 11, a microphone 12, and a speaker 13. In the following explanation, the liquid crystal display 2 is simply referred to as "display".

On one side surface (a surface on the right side of the figure) of a main body housing section (a housing) of the settlement apparatus 1, a commodity placing table 14 for placing and weighing commodities before settlement is attached. On the other side surface (a surface on the left side of the figure) of the main body housing, a commodity placing table 15 for placing and weighing settled commodities is set.

The display 2 displays an information screen for displaying various kinds of information such as an operation method. In this embodiment, the display 2 displays a receipt issue menu screen S1 (see FIG. 2), printing information selection screen S2 (see FIG. 3), and the like.

Figure 2:
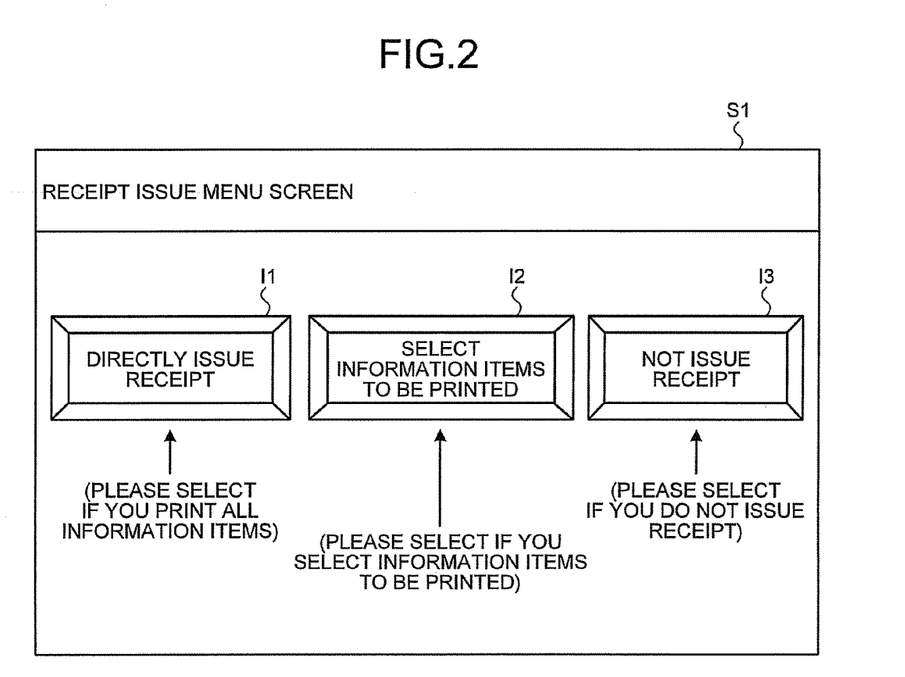
FIG. 2 is a diagram of a configuration example of a receipt issue menu screen displayed on a display.

FIG. 2 is a diagram for explaining a configuration example of the receipt issue menu screen S1 displayed on the display 2.

The receipt issue menu screen S1 is a screen for causing the customer to select an issue form of a receipt R. In the example shown in FIG. 2, a "directly issue a receipt" selection icon I1, a "select information items to be printed" selection icon I2, and a "not issue a receipt" selection icon I3 are provided in the receipt issue menu screen S1.

The "directly issue a receipt" selection icon I1 is selected and operated if all information items are printed. The "select information items to be printed" selection icon I2 is selected and operated if information items to be printed on the receipt R are selected. The "not issue a receipt" selection icon I3 is selected and operated if a receipt is not issued.

Figure 3:
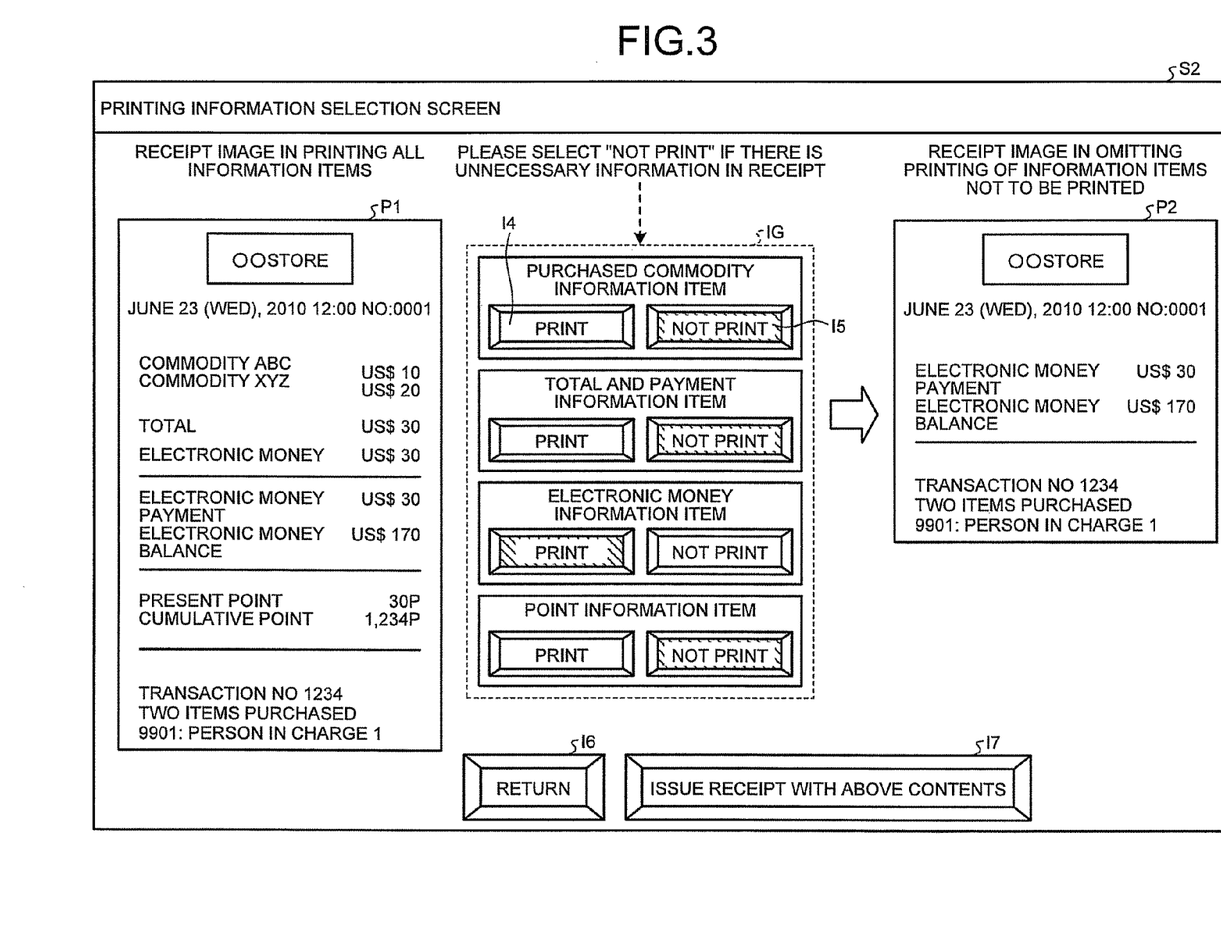
FIG. 3 is a diagram of a configuration example of a printing information selection screen displayed on the display.

FIG. 3 is a diagram for explaining a configuration example of the printing information selection screen S2 displayed on the display 2 when the "select information items to be printed" selection icon I2 of the receipt issue menu screen S1 is selected and operated.

The printing information selection screen S2 is a screen for causing the customer to select information items to be printed on the receipt R. In the example shown in FIG. 3, a first receipt image P1, a selection icon group IG, a second receipt image P2, a "return" selection icon I6, and an "issue a receipt with the above contents" selection icon I7 are provided in the printing information selection screen S2.

The first receipt image P1 is a display region where a receipt image in the case of printing of all the information items before selection by the customer is displayed.

In a display example of the first receipt image P1 shown in FIG. 3, a receipt image in which a "purchased commodity information item", a "total and payment information item", an "electronic money information item", a "point information item", and the like are displayed as all the information items is displayed.

The selection icon group IG is a display region where plural "print" selection icons I4 and plural "not print" selection icons I5 each provided for each of the information items in the first receipt image P1 are displayed. In the selection icon group IG, for each of the information items, character information ("purchased commodity information item", etc.)

indicating the information item is displayed to allow the customer to recognize a type of the information item.

In a display example of the selection icon group IG shown in FIG. 3, the "print" selection icon I4 and the "not print" selection icon I5 are displayed for each of the "purchased commodity information item", the "total and payment information item", the "electronic money information item", and the "point information item". In the display example shown in FIG. 3, the "print" selection icon I4 is selected by the customer only for the "electronic money information item". Further, in the display example shown in FIG. 3, the "not print" selection icons I5 are selected by the customer for the information items (the purchased commodity information item, the total and payment information item, and the point information item) other than the "electronic money information item".

In the display example shown in FIG. 3, a payment method is payment by electronic money. However, if the payment method is payment by cash, a cash information item (the "print" selection icon I4 and the "not print" selection icon I5) is displayed instead of the electronic money information item.

The second receipt image P2 is a display region where a receipt image in the case of omission of display of information items not to be printed in the receipt image displayed in the first receipt image P1 is displayed according to a selection state of the selection icon group IG.

In a display example of the second receipt image P2 shown in FIG. 3, display of the information items (the purchased commodity information item, the total and payment information item, and the point information item) other than the electronic money information item is omitted according to the selection state of the selection icon group IG.

The "return" selection icon I6 is an icon selected and operated if the customer returns to the receipt issue menu screen S1.

The "issue a receipt with the above contents" selection icon I7 is an icon selected and operated if the receipt R is printed and issued with contents corresponding to a selection state of the selection item group IG, i.e., contents displayed in the second receipt image P2.

In this embodiment, the first receipt image P1, the selection icon group IG, and the second receipt image P2 are displayed to fit in one screen with the images and the selection item group expanded or reduced according to the number of information items to be displayed.

In the printing information selection screen S2, it is desirable to display, in a form of allowing the customer to visually recognize a correspondence relation, the information items displayed in the first receipt image P1 and the selection icons I4 and I5 for each of the information items associated with the information items.

Referring back to FIG. 1, the scanner 3 is a reading apparatus configured to read a barcode affixed to a commodity held over a reading window by the customer. The hand-held scanner 10 is a reading apparatus used when the customer causes the reading apparatus to read a barcode of a commodity holding the reading apparatus in a hand.

The card insertion port 4 is a port into which a card for settlement such as a credit card or an electronic money card is inserted. The receipt issue port 5 is a port from which the receipt R printed and issued after all checkout jobs are completed is discharged. The coin input port 6 is a port to which coins for settlement are input. The coin discharge port 7 is a port from which change coins are discharged. The bill input port 8 is a port to which bills for settlement are input. The bill discharge port 9 is a port from which bills for change are discharged.

The camera 11 is a digital camera such as a CCD (Charge Coupled Device) camera and is a photographing apparatus configured to photograph a facial expression of the customer shown to an operator present in a remote location. The microphone 12 collects voice of the customer. The speaker 13 outputs various sounds such as voice of the operator and error sound.

Figure 4:
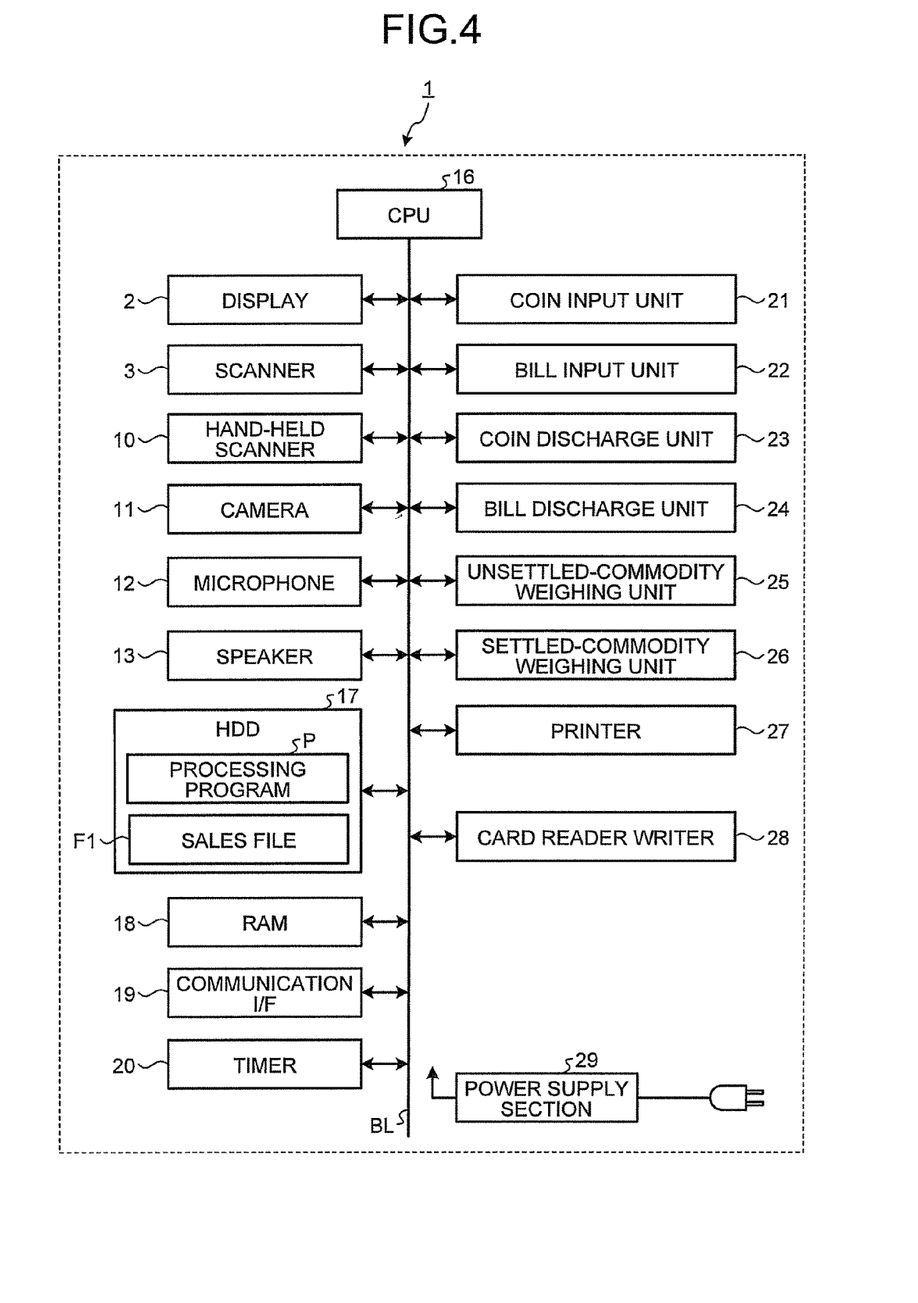
FIG. 4 is a block diagram of a hardware configuration of the POS terminal.

FIG. 4 is a block diagram for explaining a hardware configuration of the settlement terminal 1.

As shown in FIG. 4, the settlement terminal 1 includes a CPU (Central Processing Unit) 16 and the display 2, the scanner 3, the hand-held scanner 10, the camera 11, the microphone 12, and the speaker 13 explained above, a HDD (Hard Disk Drive: hard disk device) 17, a RAM (Random Access Memory) 18, a communication I/F 19, a timer 20, a coin input unit 21, a bill input unit 22, a coin discharge unit 23, a bill discharge unit 24, an unsettled-commodity weighing unit 25, a settled-commodity weighing unit 26, a printer 27, and a card reader writer 28 connected to the CPU 16 via a bus line BL. Further, the settlement terminal 1 includes a power supply section 29 configured to supply electric power to the load sections.

As shown in FIG. 4, the settlement terminal 1 includes a CPU (Central Processing unit) 16. The settlement terminal 1 includes the load sections connected to the CPU 16 via the bus line BL. The load sections include the display 2, the scanner 3, the hand-held scanner 10, the camera 11, the microphone 12, and the speaker 13. The load sections include the HDD (Hard Disk Drive: hard disk device) 17, the RAM (Random Access Memory) 18, the communication I/F 19, and the timer 20. Further, the load sections include the coin input unit 21, the bill input unit 22, the coin discharge unit 23, the bill discharge unit 24, the unsettled-commodity weighing unit 25, the settled-commodity weighing unit 26, the printer 27, and the card reader writer 28. The settlement terminal 1 includes the power supply section 29 configured to supply electric power to the load sections.

The CPU 16 controls the entire settlement apparatus 1, i.e., controls various arithmetic operations and various kinds of processing for the components. The HDD 17 stores a control program for executing the various kinds of processing in the settlement apparatus 1, in particular, in this embodiment, a processing program P for executing processing shown in FIGS. 6 and 7 explained later and various files such as a sales file F1. The RAM 18 temporarily stores data during work such as input data and display data and temporarily stores the control program, the sales file F1, and the like read out from the HDD 17 or the like during the start of the settlement apparatus 1.

The communication I/F 19 performs transmission and reception of various data to and from an external apparatus such as a store server (not shown) via a LAN (Local Area Network).

The timer 20 times the present date and time and performs timing from specific hour.

The coin input unit 21 is a unit configured to process coins input to the coin input port 6. The bill input unit 22 is a unit configured to process bills input from the bill input port 8. The coin discharge unit 23 is a unit configured to process coins discharged from the coin discharge port 7. The bill discharge unit 24 is a unit configured to process bills discharged from the bill discharge port 9.

The unsettled-commodity weighing unit 25 measures the weight of commodities placed on the commodity placing table 14. The settled-commodity weighing unit 26 measures the weight of commodities placed on the commodity placing table 15.

The printer 27 issues the receipt R on which various information items related to settlement are printed.

The card reader writer 28 performs processing for reading and writing data from and in a card inserted into the card insertion port 4.

When a plugging appliance such as a plug is connected to a commercial power supply such as a socket, the power supply section 29 converts electric power from the commercial power supply into electric power necessary for the load sections and supplies the electric power to the load sections.

Figure 5:
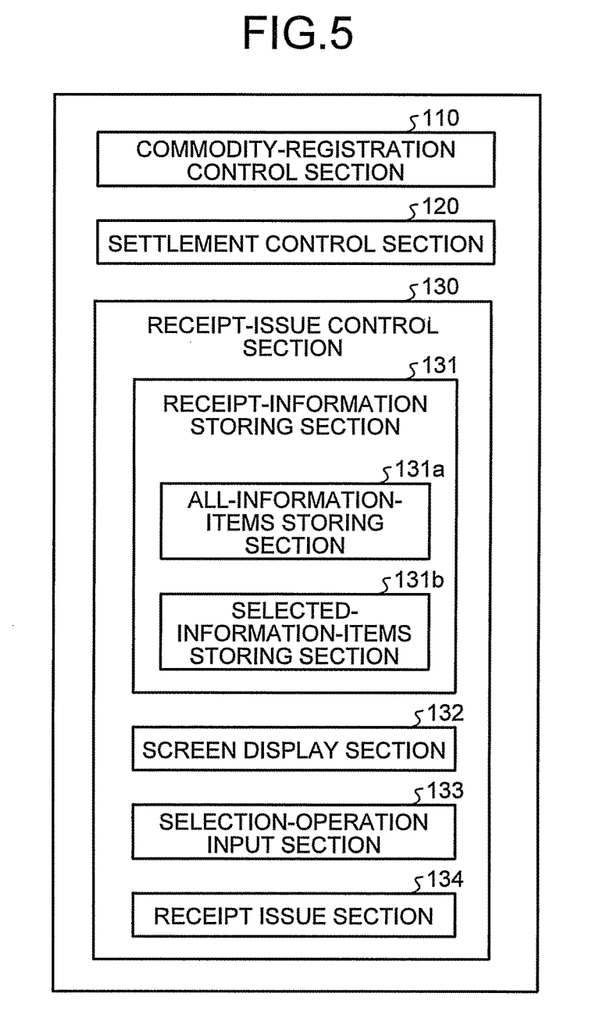
FIG. 5 is a block diagram for explaining a functional configuration in the POS terminal.

FIG. 5 is a block diagram for explaining a functional configuration in the settlement apparatus 1.

The settlement apparatus 1 includes, as functional components, a commodity-registration control section 110, a settlement control section 120, and a receipt-issue control section 130. The commodity-registration control section 110 controls commodity registration processing for each transaction. The settlement control section 120 controls settlement (checkout) processing for each transaction. The receipt-issue control section 130 controls printing and issue of the receipt R after the settlement (accounting) processing by the settlement control section 120.

The transaction is, for example, a series of processing in which operation for declaring the start of commodity registration is performed by the customer, registration processing for commodities is performed by the scanner 3 and the like, and operation for instructing calculation and display of a payment total amount is performed.

The receipt-issue control section 130 includes a receipt-information storing section 131, a screen display section 132, a selection-operation input section 133, and a receipt issue section 134.

The receipt-information storing section 131 stores information concerning information items to be printed on the receipt R. The receipt-information storing section 131 includes an all-information-items storing section 131a and a selected-information-items storing section 131b. The all-information-items storing section 131a stores information concerning all information items related to the transaction to be printed on the receipt R in normal operation. The selected-information-items storing section 131b stores only information concerning information items notified from the selection-operation input section 133 among the information items stored in the all-information-items storing section 131a.

The all-information-items storing section 131a stores information concerning information items to be printed on the receipt R from purchased commodity information received from the commodity-registration control section 110 and total and payment information, electronic money information, point information, and the like received from the settlement control section 120.

The screen display section 132 displays the receipt issue menu screen S1 and the printing information selection screen S2 on the display 2. The screen display section 132 changes display of the first receipt image P1 and the second receipt image P2 in the printing information selection screen S2 on the basis of receipt information stored by the receipt-information storing section 131.

The selection-operation input section 133 instructs, on the basis of selection operation for the receipt issue menu screen S1 and the printing information selection screen S2, the screen display section 132 to switch and display the screen S1 and the screen S2 and notifies the receipt-information storing section 131 of information items selected by the customer.

The receipt issue section 134 prints and issues the receipt R with the printer 27 on the basis of the receipt information received from the receipt-information storing section 131.

A processing operation in the settlement apparatus 1 having the configuration explained above is explained with reference to FIGS. 6 to 8.

Figure 6:
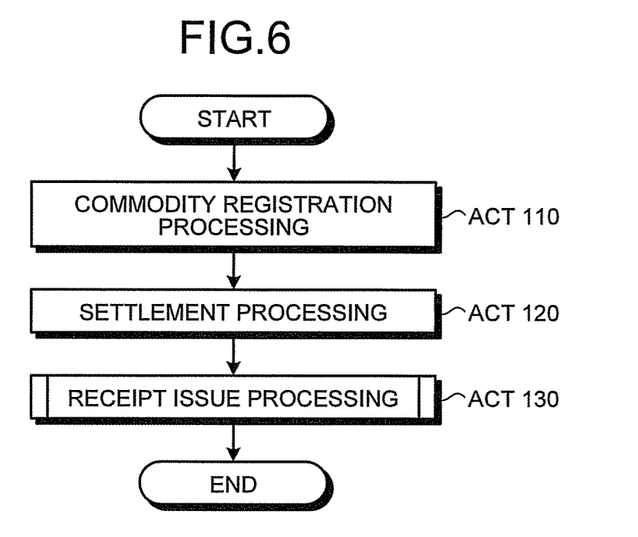
FIG. 6 is a flowchart for explaining a flow of overall processing executed in the POS terminal.
Figure 7:
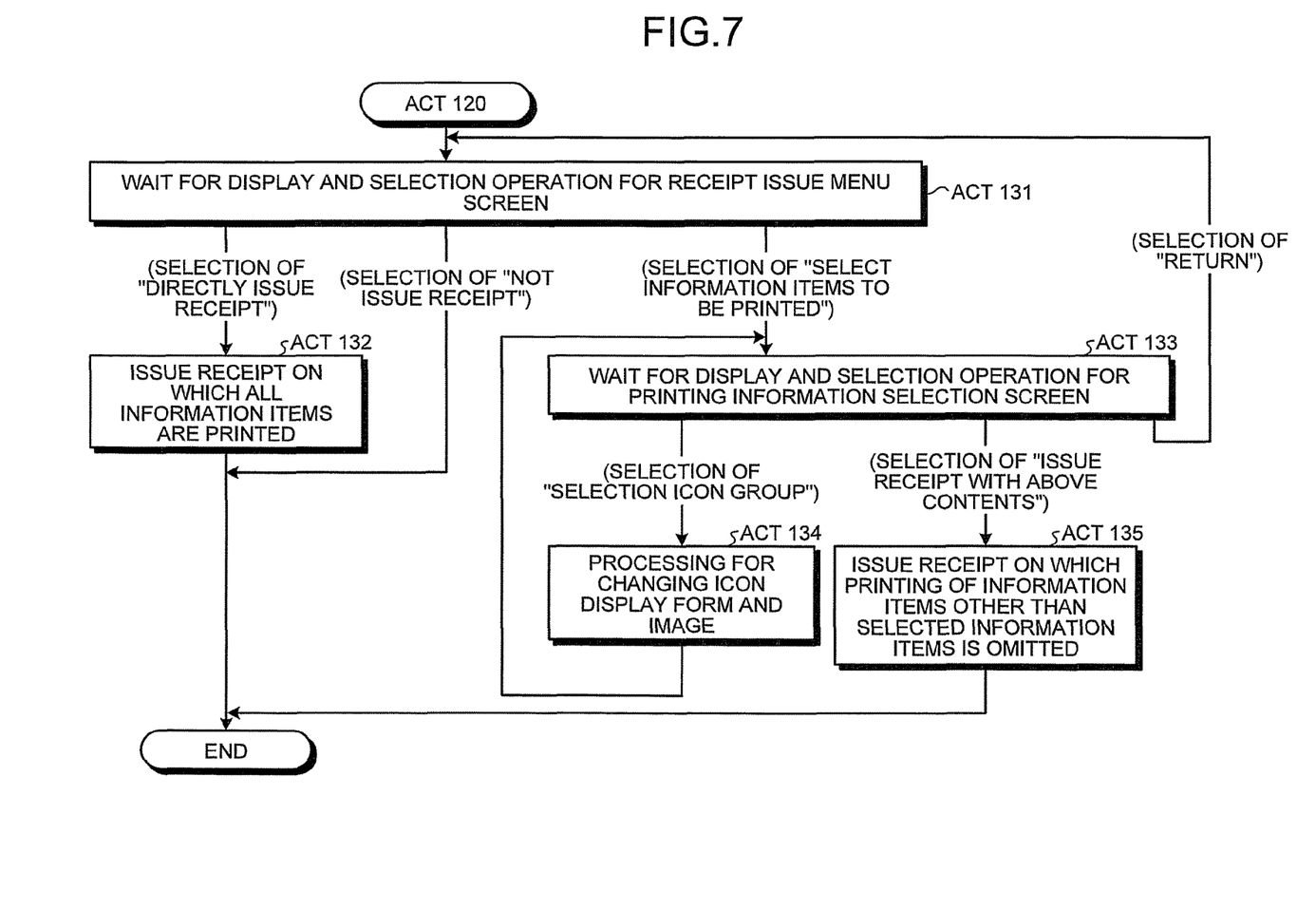
FIG. 7 is a flowchart for explaining a flow of detailed processing of an act shown in FIG. 6.

FIG. 6 is a flowchart for explaining a flow of overall processing executed in the settlement apparatus 1. FIG. 7 is a flowchart for explaining a flow of detailed processing of receipt issue processing in Act 130 shown in FIG. 6.

Figure 8A:
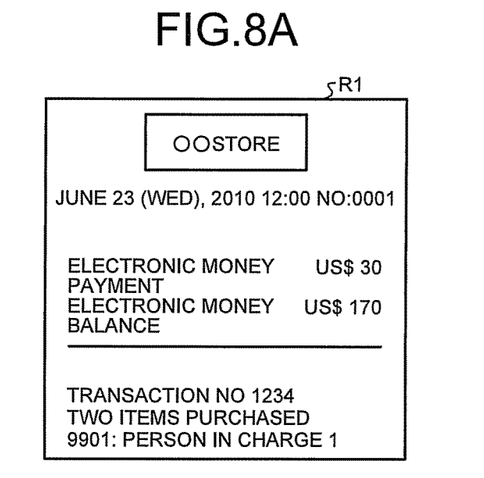
FIGS. 8A and 8B are diagrams of configuration examples of receipts issued by the POS terminal according to the embodiment.
Figure 8B:
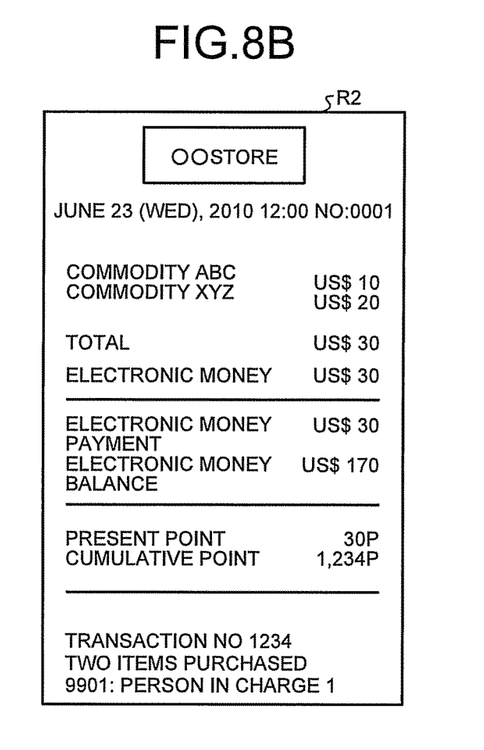

FIGS. 8A and 8B are diagrams of configuration examples of receipts R issued by the settlement apparatus 1 according to this embodiment. In FIG. 8A, a receipt R1 on which information items selected by the customer are printed and information items not selected by the customer are not printed is shown. In FIG. 8B, a receipt R2 on which all the information items are printed is shown.

In FIG. 6, in the settlement apparatus 1, first, in Act 110, the commodity-registration control section 110 executes commodity registration processing for each transaction, i.e., processing for registration in the sales file F1.

Subsequently, in Act 120, the settlement control section 120 executes settlement processing for registered commodities.

In Act 130, the receipt-issue control section 130 executes, with the printer 27, printing and issue processing for the receipt R on the basis of receipt issue setting by the customer.

Specifically, in the processing in Act 130, as shown in FIG. 7, first, in Act 131, the screen display section 132 causes the display 2 to display the receipt issue menu screen S1 and executes processing for waiting selection operation by the customer.

In the processing in Act 131, the selection-operation input section 133 receives input of selection operation for the "directly issue a receipt" selection icon I1 by the customer. Subsequently, in Act 132, the receipt issue section 134 issues, with the printer 27, the receipt R2 (see FIG. 8B) on which all the information items are printed. Thereafter, the receipt issue section 134 ends the processing.

On the other hand, if the selection-operation input section 133 receives input of selection operation for the "not issue a receipt" selection icon I3 by the customer in the processing in Act 131, the receipt issue section 134 ends the processing without performing issuance of the receipt R by the printer 27.

Further, in the processing in Act 131, the selection-operation input section 133 receives input of selection operation for the "select information to be printed" selection icon I2 by the customer. Then, in Act 133, the receipt-issue control section 130 causes the screen display section 132 to display the printing information selection screen S2 on the display 2 and executes processing for waiting for selection operation by the customer.

In processing in Act 133, the selection-operation input section 133 receives input of selection operation for the "print" selection icon I4 or the "not print" selection icon I5 of the selection icon groups IG. Then, in Act 134, the receipt-issue control section 130 switches, with the receipt-information storing section 131 and the screen display section 132, display of the selected and operated selection icon (I4 or I5) to highlighting that represents a selected state. The receipt-issue control section 130 switches display of the unselected selection icon (I4 or I5) to non-highlighting that represents an unselected state. Further, the receipt-issue control section 130 displays the selection screen S2 including the second receipt image P2, display contents of which are changed according to the selected state of the selection icon (I4 or I5).

In the processing in Act 133, the receipt-issue control section 130 receives input of selection operation for the "issue a receipt with the above contents" selection icon I7 by the customer. Then, in Act 135, the receipt issue section 134 issues, with the printer 27, the receipt R having printing contents corresponding to the selected state of the selection icons I4 and I5 of the selection icon group IG and ends the processing. Specifically, in Act 135, the receipt issue section 134 issues the receipt R1 (see FIG. 8A) on which the information items for which the "print" selection icons I4 are selected by the customer are printed and the information items for which the "not print" selection icons I5 are selected by the customer are not printed.

On the other hand, if the selection-operation input section 133 receives input of selection operation for the "return" selection icon I6 by the customer in the processing in Act 133, the receipt issue section 134 shifts to Act 131 and performs the same processing.

According to the embodiment explained above, it is possible to issue a receipt on which information items necessary for the customer are printed and information items unnecessary for the customer are not printed. According to the embodiment, printing of the information items unnecessary for the customer is omitted. Therefore, it is possible to reduce the size of a receipt to be issued and realize saving of resources.

The settlement apparatus is explained on the basis of the exemplary embodiment. However, embodiments are not limited to the embodiment explained above.

For example, in the embodiment explained above, the form including the two icons, i.e., the "print" selection icon I4 and the "not print" selection icon I5 as the selection icons for selecting "print" or "not print" for each of information items to be printed on the receipt R is explained. However, embodiments are not limited to this. In an embodiment, it is also possible to adopt a form including selection icons for alternately displaying character information of "print" and "not print" every time selection operation by the customer is performed.

In the embodiment explained above, the form of displaying, in the first receipt image P1, the settlement information related to a transaction actually subjected to commodity registration and settlement is explained. However, embodiments are not limited to this. In an embodiment, it is also possible to adopt a configuration for selectively displaying sample images having the number of information items corresponding to information items actually purchased by the customer.

In the embodiment explained above, the form of expanding and reducing, in the first receipt image P1, the images and the selection icon group according to the number of information items to be displayed and displaying the images and the selection icon group to fit in one screen is explained. However, embodiments are not limited to this. In an embodiment, it is also possible to adopt a form of scroll-displaying, in the up-down direction, the receipt images and the selection icons of the selection icon group on the basis of operation of a scroll button icon by the customer.

In the embodiment explained above, the form of changing, in the second receipt image P2, the size of the receipt image according to a selection state of the selection item group IG by the customer and displaying the receipt image is explained. However, embodiments are not limited to this. In an embodiment, it is also possible to adopt a form of performing only display and non-display of information to be printed without changing the size.

In the embodiment explained above, the form of causing the customer to select information to be printed on the receipt R using the selection icon group IG of the printing information selection screen S2 displayed on the display 2 if the "select information to be printed" selection icon I2 is selected is explained. However, embodiments are not limited to this. In an embodiment, it is also possible to adopt a form of causing the customer to select information to be printed on the receipt R using a screen including a selection icon "print only . . . information" provided for each of the information items such as "print only electronic money information" instead of the selection icon I2.

In the embodiment explained above, the form of using the printing information selection screen S2 in which the first receipt image P1 and the second receipt image P2 are displayed is explained. However, embodiments are not limited to this. In an embodiment, it is also possible to use a selection screen for displaying only one of the first receipt image P1 and the second receipt image P2 and a selection screen for not displaying both the images.

In the settlement apparatus of a cashless type explained above, the number of electronic money information items is not one. Plural electronic money information items are displayed according to a type of an electronic money card. The customer is enabled to select an electronic money information item out of the electronic money information items.

In the embodiment explained above, the self-type settlement apparatus is explained. However, besides the self-type settlement apparatus, it is also possible to adopt a settlement apparatus with which commodity registration operation and settlement operation by a store clerk are performed.

In the embodiment explained above, the form of causing the customer to select information items to be printed on the receipt R using the selection screens (the receipt issue menu screen S1 and the printing information selection screen S2) displayed on the display 2 is explained. However, embodiments are not limited to this. In an embodiment, it is also possible to adopt a form of providing a key of a pushbutton type or the like allocated in advance for each of information items to be printed and changing information items to be printed on the receipt R according to pressing operation of the key of the pushbutton type.

Besides, in an embodiment, it is also possible to adopt a form of selecting and pressing, with a finger, an arbitrary information item included in the first receipt image P1, moving (dragging) the finger in the pressing state, and releasing (dropping) the finger on the second receipt image P2 to thereby change an information item to be printed on the receipt R.

The processing program P1 executed in the settlement apparatus 1 according to the embodiment explained above may be provided to be incorporated in storing means such as a ROM in advance. The processing program P1 may be configured to be provided while being recorded in a computer-readable recording medium such as a USB (Universal Serial Bus) storage medium as a file of an installable format or an executable format. Further, the processing program P1 may be configured to be provided or distributed through a network such as the Internet.

Besides, the external appearance of the settlement apparatus, the hardware configuration and the software configuration, the screen configuration displayed on the display, the processing procedure, and the like in the embodiment explained above are described as mere examples. Embodiments are not limited by the external appearance of the settlement apparatus, the hardware configuration and the software configuration, the screen configuration displayed on the display, the processing procedure, and the like.

What is claimed is:

1. A POS terminal comprising:
a printer configured to print and issue a receipt related to a commodity transaction;

a display configured to display information;

a screen display section configured to display, on the display, a first selection screen for selecting an issue form of the receipt, and a second selection screen for selecting at least one of a plurality of information items which are capable of being printed on the receipt, the information items including an information item of a name of a purchased commodity related to the commodity transaction, an information item of a price of the purchased commodity, and a total price of the commodity transaction, a first operation element being displayed on the first selection screen, the first operation element being used for selecting one of a first issue form that the receipt on which all of the information items are printed without selecting the at least one of the information items is issued, a second issue form that the receipt on which the information item selected of the information items is printed and the information item not-selected of the information items is not printed is issued, and a third issue form that the receipt is not issued, the second selection screen being displayed when the second issue form is selected on the first selection screen, all of the information items being displayed on the second selection screen, a second operation element being displayed on the second selection screen, the second operation element being used for selecting whether each of the information items is printed on the receipt;

a selection-operation input section configured to select, according to selection operation using the second operation element on the second selection screen displayed by the screen display section, the at least one of the information items as the information item to be printed on the receipt;

an issue section configured to issue a receipt on which the information item selected by the selection-operation input section is printed and an information item not selected by the selection-operation input section is not printed; and a storage section configured to store, when the second issue form is selected, electronic data of the second information item, and configured to store, when the first issue form in selected, the electronic data of all of the information items, and configured to store, when the third issue form is selected, the electronic data of all of the information items.

2. The apparatus according to claim 1, wherein the screen display section displays, in the selection screen, an image of a receipt including all information items corresponding to each transaction and plural icons for selecting, for each of the information items included in the image, "print" or "not print" of the information items.

3. The apparatus according to claim 2, wherein the screen display section displays the selection screen in which the information items included in the image of the receipt and the selection icons associated with the information items are displayed in same display order.

4. The apparatus according to claim 2, wherein the screen display section further displays, in the selection screen, according to selection of the selection icon, an image of a receipt on which display of the information item not to be printed is omitted.

5. The apparatus according to claim 1, wherein the selection-operation input section selects information to be printed on the receipt according to selection operation for a selection icon provided for each of information items to be printed on the receipt.

6. The apparatus according to claim 1, wherein a customer himself or herself who performs the commodity transaction performs operation of the selection screen.

7. A control method executed in a POS terminal including a printer configured to print and issue a receipt related to a commodity transaction and a display configured to display information, the POS terminal including a control section and the method being executed in the control section, the method comprising:

a screen display section displaying, on the display, a first selection screen for selecting an issue form of the receipt, and a second selection screen for selecting at least one of a plurality of information items which are capable of being printed on the receipt, the information items including an information item of a name of a purchased commodity related to the commodity transaction, an information item of a price of the purchased commodity, and a total price of the commodity transaction, a first operation element being displayed on the first selection screen, the first operation element being used for selecting one of a first issue form that the receipt on which all of the information items are printed without selecting the at least one of the information items is issued, a second issue form that the receipt on which the information item selected of the information items is printed and the information item not-selected of the information items is not printed is issued, and a third issue form that the receipt is not issued, the second selection screen being displayed when the second issue form is selected on the first selection screen, all of the information items being displayed on the second selection screen, a second operation element being displayed on the second selection screen, the second operation element being used for selecting whether each of the information items is printed on the receipt;

a selection-operation input section selecting, according to selection operation using the second operation element on the second selection screen displayed by the screen display section, the at least one of the information items as the information item to be printed on the receipt;

an issue section issuing a receipt on which the information item selected by the selection-operation input section is printed and an information item not selected by the selection-operation input section is not printed; and a storage section storing, when the second issue form is selected, electronic data of the selected information item, and configured to store, when the first issue form is selected, the electronic data of all of the information items, and configured to store when the third issue form is selected, the electronic data of all of the information items.

8. The method according to claim 7, wherein the screen display section displays, in the selection screen, an image of a receipt including all information items corresponding to each transaction and plural icons for selecting, for each of the information items included in the image, "print" or "not print" of the information items.

9. The method according to claim 8, wherein the screen display section displays the selection screen in which the information items included in the image of the receipt and the selection icons associated with the information items are displayed in same display order.

10. The method according to claim 8, wherein the screen display section further displays, in the selection screen, according to selection of the selection icon, an image of a receipt on which display of the information item not to be printed is omitted.

11. A control method for a POS terminal, the control method comprising:
- printing and issuing a receipt related to a commodity transaction;
- first displaying information;
- second displaying, on a display, a first selection screen for selecting an issue form of the receipt and a second selection screen for selecting at least one of a plurality of information items which are capable of being printed on the receipt, the information items including an information item of a name of a purchased commodity related to the commodity transaction, an information item of a price of the purchased commodity, and a total price of the commodity transaction, a first operation element being displayed on the first selection screen, the first operation element being used for selecting one of a first issue form that the receipt on which all of the information items are printed without selecting the at least one of the information items is issued, a second issue form that the receipt on which the information item selected of the information items is printed and the information item not-selected of the information items is not printed is issued, and a third issue form that the receipt is not issued, the second selection screen being displayed when the second issue form is selected on the first selection screen, all of the information items being displayed on the second selection screen, a second operation element being displayed on the second selection screen, the second operation element being used for selecting whether each of the information items is printed on the receipt;
- selecting, according to a selection operation using the second operation element on the second selection screen displayed by the second displaying, the at least one of the information items as the information items to be printed on the receipt;
- issuing a receipt on which the information item selected by the selecting is printed and an information item not selected by the selecting is not printed; and
- storing, when the second issue form is selected, electronic data of the selected information item, and storing, when the first issue form is selected, the electronic data of all of the information items, and storing, when the third issue form is selected, the electronic data of all of the information items.

12. The method according to claim 11, wherein the second displaying displays, in the selection screen, an image of a receipt including all information items corresponding to each transaction and plural icons for selecting, for each of the information items included in the image, "print" or "not print" of the information items.

13. The apparatus according to claim 12, wherein the second displaying displays the selection screen in which the information items included in the image of the receipt and the selection icons associated with the information items are displayed in same display order.

14. The apparatus according to claim 12, wherein the second displaying further displays, in the selection screen, according to selection of the selection icon, an image of a receipt on which display of the information item not to be printed is omitted.

15. The apparatus according to claim 11, wherein the selecting selects information to be printed on the receipt according to selection operation for a selection icon provided for each of information items to be printed on the receipt.

16. The apparatus according to claim 11, wherein a customer who performs the commodity transaction performs operation of the selection screen.

* * * * *